United States Patent Office 3,336,251
Patented Aug. 15, 1967

3,336,251
RAPID CURING FLUIDIZED BED COATING
COMPOSITION
Joseph P. Manasia, Union, N.J., assignor to Shell Oil
Company, New York, N.Y., a corporation of Delaware
No Drawing. Filed May 14, 1964, Ser. No. 367,573
7 Claims. (Cl. 260—18)

This invention relates to a fast curing thermosetting resin coating composition. More particularly, this invention relates to a polyepoxide resin composition which is especially suitable for application in fluidized bed processes and molding compositions.

Specifically, the invention provides a fluidized polyepoxide coating composition which comprises (1) a polyepoxide having a vic-epoxy equivalency greater than one, (2) certain adducts of trimellitic anhydride and (3) a stannous salt of a monocarboxylic acid containing at least 5 carbon atoms and preferably a fatty acid having from 5 to about 20 carbon atoms.

There is a constant need to develop thermosetting resin coatings which cure relatively fast, i.e., less than a few minutes while exhibiting the necessary degree of hardness, solvent resistance and flexibility. Many thermosetting resin compositions are today employed; however, they lack to a greater or lesser extent one or more of these desirable properties. A relatively good resin composition having a relatively fast cure is a composition comprising an epoxy resin and a polyfunctional hardener hydrazide such as isophthalyl dihydrazide. Examples of such heat-curable compositions are described in U.S. 2,847,395, issued Aug. 12, 1958. Other compositions which do not have the desired speed of cure and flexibility include certain polyepoxides cured with a trimellitic anhydride-ethylene glycol adduct. Therefore, while there are several compositions which possess rapid cure properties, such compositions do not possess the necessary flexibility demanded by some applications.

It was quite unexpectedly discovered that rapid-curing thermosetting epoxy compositions having a greater flexibility and solvent resistance while curing very rapidly, say, in less than 60 seconds, are obtained when a stannous salt of a monocarboxylic acid, particularly a fatty acid having from about 5 to about 20 carbon atoms and more particularly from about 6 to 12 carbon atoms in the molecule, is used in combination with adducts of trimellitic anhydride and polyhydric alcohols containing from about 2 to about 20 carbon atoms and polyepoxides having a vic-epoxy equivalency greater than 1.0.

It is therefore the primary object of the present invention to provide a rapid-curing, flexible, chemical resistant polyepoxide coating composition which is particularly suitable for use in fluidized bed processes. This and other objects will become apparent to one skilled in the art from the following detailed disclosure.

The objects of the present invention may be accomplished by the instant compositions which comprise a polyepoxide having a vic-epoxy equivalency greater than 1.0, an adduct of trimellitic anhydride and a polyhydric alcohol containing from 2 to 20 carbon atoms and a stannous salt of a monocarboxylic acid, particularly a fatty acid having from about 5 to about 20 carbon atoms in the molecule.

In the absence of stannous salts the speed of cure is measured in minutes rather than seconds. Further, unexpectedly outstanding flexibility and solvent resistance are obtained when such stannous salts are employed. Particularly rapid cures and particularly flexible coatings are obtained when stannous octoate is employed.

The polyepoxide materials used in preparing the compositions of the present invention comprise those organic materials which have more than one vic-epoxy group, i.e., more than one

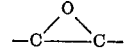

group, which group may be in a terminal position, i.e., a

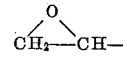

group, or in an internal position, i.e., a

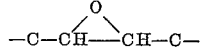

The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides include, among others, 1,4-bis(2,3-epoxypropoxy)benzene, 1,3-bis(2,3-epoxypropoxy)benzene, 4,4'-bis(2,3-epoxypropoxy)diphenyl ether, 1,8-bis(2,3-epoxypropoxy)octane, 1,4-bis(2,3-epoxypropoxy)cyclohexane, 4,4'-bis(2-hydroxy-3,4'-epoxybutoxy)diphenyl dimethylmethane, 1,3-bis(4,5-epoxypentoxy)-5-chlorobenzene, 1,4-bis(3,4-epoxybutoxy)-2-chlorocyclohexane, 1,3-bis(2-hydroxy-3,4-epoxybutoxy)benzene, 1,4-bis(2-hydroxy-4,5-epoxypentoxy)benzene.

Other examples include the epoxy polyethers of polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol A), 2,2-bis(4-hydroxyphenyl)butane, 4,4'-dihydroxybenzophenone, bis(4-hydroxyphenyl)ethane, 2,2-bis(4-hydroxyphenyl)pentane and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated polyethers A, B, C and D.

Another group of polyepoxides comprises the polyepoxypolyethers obtained by reacting, preferably in the presence of an acid-acting compound, such as hydrofluoric acid, or of the aforedescribed halogen-containing epoxides, such as epichlorohydrin, with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyalkyl alcohol, polyvinyl alcohol, inositol, trimethylolpropane, bis(4-hydroxycyclohexyl)dimethylmethane and the like.

The preparation of suitable such polyepoxide polyethers is illustrated in U.S. 2,633,458 as polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 300 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung, walnut and dehydrated caster oil, methyl linoleate, butyl linolinate, ethyl 9,12-octadecadienoate, butyl 9,12,15-octadecatrienoate, ethyl eleostearate, octyl 9,12-octadecadienoate, methyl eleostearate, monoglycerides of tung oil fatty acids, monoglycerides of soyabean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example di(2,3-epoxybutyl)adipate, di(2,3-epoxybutyl)-oxalate, di(2,3-epoxyhexyl)succinate, di(2,3-epoxyoctyl)-tetrahydrophthalate, di(4,5-epoxydodecyl)maleate, di(2,3-epoxybutyl)terephthalate, di(2,3 - epoxypentyl)thiodipropionate, di(2,3-epoxybutyl)citrate and di(4,5-epoxyoctadecyl)malonate, as well as the esters of epoxycyclohexanol and epoxycyclohexylalkanols, such as, for example, di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4 - epoxyhexyl, 3,4 - epoxypentanoate, 3,4-epoxycyclohexyl 3,4-cyclohexanoate, 2,3-epoxycyclohexylmethyl 2,3 - epoxycyclohexanoate, and 3,4-epoxycyclohexyl 4,5-epoxyoctanoate, and the like.

Another group of materials having internal epoxy groups include epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13 - diepoxyeicosanedioate, dibutyl 7,8,11,12 - diepoxyoctadecanedioate, dioctyl 10,11-diethyl - 8,9,12,13 - diepoxyeicosanedioate, dicyclohexyl 3,4,5,6-diepoxycyclohexane-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyetster obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes epoxidized hydrocarbons, such as epoxidized 2,3-bis(cyclohexenyl)propane, 2,2-bis-(cyclohexenyl)butane, 8,10-octadecadiene and the like.

Polyepoxides having an epoxy equivalent weight of between 400 and 4,000 are prefered. Polyepoxides having an average molecular weight above 500, as for example, between about 800 and 1500 and between about 2700 and 3100 are especially preferred. Very suitable polyepoxides are those formed from an epihalohydrin, and particularly epichlorohydrin, and a polyhydric compound, such as 2,2-bis(4-hydroxyphenyl)propane or glycerol.

The polyepoxide which is used in the composition of the present invention may be entirely a solid grade of resin as are the polyethers D and E, noted above, or may be a blend of resins in which one of them is a liquid grade, such as, a polyepoxide having an epoxy equivalent weight of between 225 and 290 and an average molecular weight of between 450 and 500 as represented by polyether A. Thus, a suitable mixture of polyepoxides is a mixture containing between 60% by weight of a solid polyepoxide derived from an epihalohydrin and 2,2-bis-(4-hydroxyphenyl)propane having an epoxy equivalent weight of between 1,650 and 2,050 and an average molecular weight of between 2,700 and 3,100 (see, for example, U.S. 2,633,458, column 6, line 74 to column 7, line 9) and between 40% and 20% by weight of a liquid polyepoxide derived from an epihalohydrin and diphenylol propane having an epoxy equivalent weight of between 175 and 210, and an average molecular weight of between 350 and 400 (polyether A).

The polyepoxide may also be a blend of solid resins, and preferably a blend of a resin having a melting point higher than 100° C., and preferably, a resin having a melting point in the range of 120–160° C., and a resin having a melting point below 80° C., and preferably a resin having a melting point in the range of 60–80° C., the melting point being determined according to Durrans' Mercury Method. Thus, another suitable mixture of polyepoxides is a mixture containing between 30 and 50% by weight of a solid polyepoxide derived from an epihalohydrin and diphenylol propane and having an epoxy equivalent weight of between 1,650 and 2,050, and a melting point of between 120 and 160° C. and between 50 and 70% by weight of a solid polyepoxide derived from an epihalohydrin and diphenylol propane having an epoxy equivalent weight of between 450 and 525, and a melting point of between 60 and 80° C. (polyether D).

Suitable trimellitic anhydride adducts may be represented by the general structural formula:

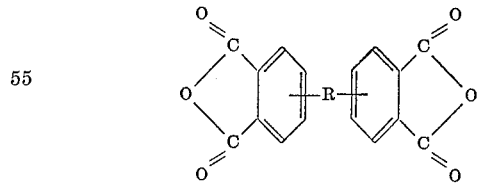

wherein R represents a hydrocarbon radical, preferably having from 2 to 12 carbon atoms, and wherein the aromatic nuclei may be substituted with one or more halogen atoms and/or one or more hydrocarbyl groups. Especially good results are obtained when the adduct is an adduct of trimellitic anhydride and a polyhydric alcohol, preferably a glycol, such as ethylene glycol.

Thus, an especially preferred trimellitic anhydride-ethylene glycol adduct is represented by the formula:

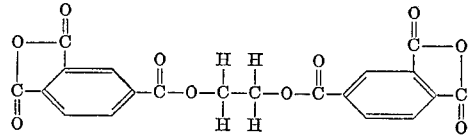

This and other trimellitic anhydride adducts may be prepared by any well-known techniques, such as by an acidolysis exchange reaction between trimellitic anhydride and a glycol diester.

Thus, a very suitable adduct may be prepared by reacting 2 moles of trimellitic anhydride with 1 mole of ethylene glycol diester (diacetic acid ester of ethylene glycol).

Stannous salts which are especially suitable for catalyzing the present compositions are the stannous salts of monocarboxylic acids having at least 5 carbon atoms, preferably fatty acids containing from about 5 to about 20 carbon atoms and more preferably from about 6 to 12 carbon atoms. Suitable stannous salts include, among others, stannous caproate, stannous octoate, stannous laurate, stannous palmitate, stannous stearate, stannous oleate, and stannous naphthenate. Stannous octoate is particularly preferred because it promotes exceptionally rapid cures and imparts outstanding flexibility as well as high impact strength and solvent resistance to the cured films and molding compositions. The stannous salt catalyst is beneficially employed in concentrations from about 0.1 to 5 parts per one hundred parts of polyepoxide and preferably from about 0.5 to 5 parts per one hundred parts of polyepoxide.

Suitable fillers which may be employed as desired, include, among many others, aluminum powder, mica, bentonites, clays, synthetic resins and elastomers, ignited $Al_2O_3$, short-fiber asbestos, wood flour, carbon black, silica, zinc dust, talc and the like. A large number of fillers are available commercially in particle sizes from about 0.1 micron upward.

The quantity of fillers used is dependent upon many factors such as, cost, particle size, particle shape, absorption characteristics and loading volume. The lightweight fillers such as asbestos and uncompressed mica are employed in ratios below 50 phr. (parts per one hundred parts of polyepoxide) and generally below 35 phr.; the medium weight fillers, such as talc and powdered aluminum, may be employed up to about 100 phr.; and the heavier fillers may be employed up to about 150 phr. In general, however, in order to optimize raw material costs without minimizing coating properties, the ratio of filler to polyepoxide ranged from about 10 to about 60 phr.

It is generally desirable, although not necessary, to employ a thixotroping agent to prevent dripping or sagging at high film build. Any of the thixotroping agents normally used in the art are suitable for use in the present compositions, including silica aerogels, bentonite clays and their derivatives, castor oil derivatives and the like.

The proportions of the polyepoxide, trimellitic anhydride-polyhydric alcohol adduct, stannous salt of monocarboxylic acid, fillers, catalysts, thixotroping agents and other additives will vary within wide ranges; however, rapid cure and excellent film flexibility is achieved when the final composition comprises from about 50 to 80 parts by weight of polyepoxide and from about 5 to 20 parts by weight of the trimellitic anhydride-polyhydric alcohol adduct; from about 0.1 to 5 parts of a stannous salt of a monocarboxylic acid; and, optionally, from about 5 to 30 parts by weight of filler.

A particularly good composition possessing outstanding flexibility and solvent resistance when cured in 1 minute or less at a temperature range of 400–450° F. comprises from about 65 to 75 parts by weight of a glycidyl polyether of 2,2-bis(4-hydroxyphenyl)propane having a molecular weight of from about 900 to about 1500, an epoxide value of about 0.10 to about 0.20 eq./100 g., and a hydroxyl value of about 0.32 to 0.35 eq./100 g., from about 8 to 15 parts by weight of a trimellitic anhydride-ethylene glycol adduct and from about 0.5 to 2.0 parts by weight of stannous octoate. No appreciable degradation in coating properties are observed when from about 5 to 30 parts by weight of a filler is added to this composition.

Another particularly good composition having excellent flexibility and rapid curing properties is obtained when the polyepoxide in the above composition is a glycidyl polyether of 2,2-bis(4-hydroxyphenyl)propane having an epoxy value of about 0.05 eq./100 g., a molecular weight of about 2900 and a melting point of from about 127–133° C. by Durrans' Mercury Method.

The coating compositions of the present invention can be prepared as powders or in solution. When powders are desired, they can be prepared by dry blending techniques.

Mixtures of cresylic acid with high boiling aromatic hydrocarbons have been found suitable for preparing these coatings from solution.

In general, the average particle size of the powders may range from rather small particle sizes of, say, 5 microns or even smaller, to 600 microns or greater. An especially preferred range is between 50 and 300 microns. A very suitable fluidizable composition was prepared by micropulverizing the blended components to pass through 100 mesh size screen (147 microns).

Any of the conventional fluidized bed coating techniques may be employed wherein the fluidized bed comprises the instant compositions maintained in a dense turbulent condition by means of a gaseous stream continuously introduced into the fluidized bed. In general, in carrying out a fluidized bed coating process, the article is preferably heated to a temperature of at least 100° C., and preferably between about 120° and 250° C., before it is dipped into the fluidized bed. If an article is to be completely coated it should of course be completely immersed in the fluidized bed. The article is preferably moved backwards and forwards in the bed, over a period of time determined by the desired thickness of coating. For the production of thin coatings, i.e., less than 0.015 inch thick, the period during which an article is dipped or immersed into the bed is usually less than 3 seconds.

After the article has been in contact with the fluidized bed for the desired time, it is removed, excess powder adhering to the article is preferably removed, and the coating cured by heating to at least 125° C., preferably between 150 and 250° C.

The compositions of the instant invention may also be sprayed as by a compressed air spray gun or electrostatically, i.e., by maintaining a difference in electrostatic charge between the particles and the article to be coated.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages disclosed are by weight.

EXAMPLE I

This example illustrates the preparation of the fluidizable polyepoxide compositions as well as their superiority over a conventional fast-cure epoxy powdered system.

A rapid curing flexible composition was prepared by dry blending the following components:

| | Percent weight |
|---|---|
| Polyepoxide (a glycidyl polyether of 2,2-bis(4-hydroxyphenyl)propane having a melting point of 98° C., a molecular weight of 1400 and an epoxide value of 0.103 eq./100 g.) | 63.28 |
| An ethylene glycol-trimellitic anhydride adduct (TMX 220) | 6.72 |
| Filler (Silica 219, fine silica sand) | 29.00 |
| Thixotroping agent (Santocel 54, a silica aerogel containing 94% $SiO_2$) | 1.00 |
| Stannous octoate _____phr.[a] | 1 |

[a] Parts per 100 parts of polyepoxide.

Any one of the following three dry blending procedures may be employed:

(1) All the dry ingredients are loaded into a Jar Mill with about a 10% media charge and pulverized to 100 mesh or finer. The liquid stannous octoate is then added to the mill and the charge re-run for an additional 15–20 minutes to insure a uniform coating of the catalyst on the particle surface of the blended dry ingredients.

(2) All the dry ingredients which have previously been ground to 100 mesh or finer are loaded into a Rota-Cone Blender equipped with agitator and liquid spraying device. The liquid stannous octoate catalyst is metered in by pump pressure while the unit is operating.

(3) Similar to above but using a ribbon mixer with mullers and spraying the catalyst through the cover of the unit.

This composition was then evaluated for impact resistance, solvent resistance and flexibility at fast curing time.

A fluidized bed was prepared and a coating having film thickness of 10 mils was applied to ¾″ diameter, 6″ long sandblasted round steel probes. The coating was then cured for 30 seconds at 450° F.

The impact was determined on the film by direct impact measured in inch-pounds required to shatter the coating.

The solvent resistance was determined by immersing the coated article in methyl ethyl ketone. The time was then recorded when the surface coating could be scratched with the fingernail.

To evaluate the flexibility, a No. 10 copper wire was coated with the above-identified composition to a film thickness of 10 mils. The cured wire coating was then clamped firmly on a 1 inch-round mandrel. The free end was then bent around the mandrel until the first crack appeared on the wire coating. The angle at which such cracking occurred was measured in degrees.

The procedure was essentially repeated wherein the novel polyepoxide composition of the present invention was replaced with a commercially available proprietary rapid curing hydrazide-epoxy system.

The comparative results are tabulated below.

| Composition | Impact Resistance (in.-lbs.) | Solvent Resistance (MEK) (min.) | Flexibility (deg.) |
|---|---|---|---|
| Polyepoxide, ethylene glycol-trimellitic anhydride adduct, stannous octoate | 20-25 | 3 | >90 |
| A proprietary hydrazide-epoxide composition | 10-15 | 0.5 | 10 |

EXAMPLE II

Substantially the same procedure was repeated as in Example I except the polyepoxide employed was a glycidyl polyether of 2,2-bis(4-hydroxyphenyl) having a molecular weight of 2900, a softening point of 131″ C., and an epoxy value of 0.05 eq./100 grams. Similar superior impact resistance and flexibility were observed. The solvent resistance while not as good as the polyepoxide coating composition of Example I, was still better than the hydrazide-epoxide system.

EXAMPLE III

This example illustrates the superiority of fluidized polyepoxide coating compositions cured with an adduct of ethylene glycol and trimellitic anhydride and catalyzed with stannous octoate over the same coating composition without the stannous octoate.

The procedure of Example I was repeated wherein the stannous octoate was incorporated into one composition and omitted from another.

The comparative results are tabulated below:

| Composition | Impact Resistance (in.-lbs.) | Solvent Resistance (MEK) (min.) | Flexibility (deg.) |
|---|---|---|---|
| Polyepoxide and ethylene glycol-trimellitic anhydride adduct | None | None | <10 |
| Polyepoxide, ethylene glycol-trimellitic anhydride adduct and stannous octoate | 20-25 | 3 | >90 |

EXAMPLE IV

Related results are obtained when stannous octoate is replaced with an equivalent amount of stannous caproate, stannous laurate, stannous oleate or stannous naphthenate.

I claim as my invention:

1. A heat-curable, fluidizable, pulverulent polyepoxide coating composition having a particle size range between about 5 and 600 microns which comprises
   (1) from 50 to 80 parts by weight of a polyepoxide having a vic-epoxy equivalency greater than 1.0 and an epoxy equivalent weight of between 400 and 4000,
   (2) from 5 to 20 parts by weight of an adduct having the formula:

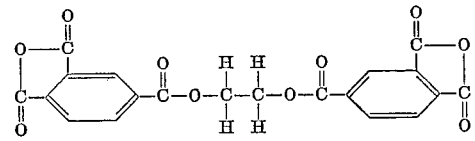

and (3) from 0.1 to 5 parts by weight per one hundred parts of the polyepoxide of a stannous salt of a monocarboxylic acid.

2. A fluidizable polyepoxide coating composition as in claim 1 wherein the polyepoxide is a glycidyl polyether of a polyhydric phenol.

3. A fluidizable polyepoxide coating composition as in claim 1 which additionally comprises from 5 to 30 parts by weight of a filler.

4. A fluidizable polyepoxide coating composition as in claim 1 wherein the stannous salt is a salt of a fatty acid containing from 5 to 20 carbon atoms in the molecule.

5. A heat-curable, fluidizable, pulverulent polyepoxide coating composition having a particle size range between about 50 and 300 microns and possessing fast-cure properties which comprises from 50 to 80 parts by weight of a glycidyl polyether of 2,2-bis(4-hydroxyphenyl)propane, from 5 to 20 parts by weight of an ethylene glycol-trimellitic anhydride adduct and from 0.5 to 5 parts of stannous octoate per one hundred parts of the glycidyl polyether.

6. A heat-curable, fluidizable, pulverulent polyepoxide coating composition having a particle size range between about 50 and 300 microns and possessing fast-cure properties which comprises from 65 to 75 parts by weight of a glycidyl polyether of 2,2-bis(4-hydroxyphenyl)propane having a molecular weight of from 900 to 1500 and an epoxide value of from 0.10 to 0.20 eq./100 g., from 8 to 15 parts by weight of an ethylene glycol-trimellitic anhydride adduct and from 0.5 to 2.0 parts by weight of stannous octoate.

7. A composition as in claim 6 wherein the glycidyl polyether of 2,2-bis(4-hydroxyphenyl)propane has a molecular weight of 2700 to 3100 and an epoxide value of about 0.05 eq./100 g.

References Cited

UNITED STATES PATENTS

| | | | |
|---|---|---|---|
| 3,039,987 | 6/1962 | Elbling | 260—37 |
| 3,102,043 | 8/1963 | Winthrop et al. | 260—47 X |
| 3,182,074 | 5/1965 | Loncrini | 260—2 X |
| 3,183,248 | 5/1965 | Hirsch et al. | 260—47 X |
| 3,201,360 | 8/1965 | Proops | 260—18 |
| 3,269,974 | 8/1966 | Childs | 260—830 X |
| 3,269,975 | 8/1966 | Childs | 260—37 |

FOREIGN PATENTS 903,933   8/1962   Great Britain.

DONALD E. CZAJA, *Primary Examiner.*

LEON J. BERCOVITZ, *Examiner.*

C. W. IVY, *Assistant Examiner.*